March 17, 1970     R. L. HURTLE     3,501,677
CURRENT LIMITING STATIC ALTERNATING CURRENT CIRCUIT BREAKER
Filed July 20, 1967
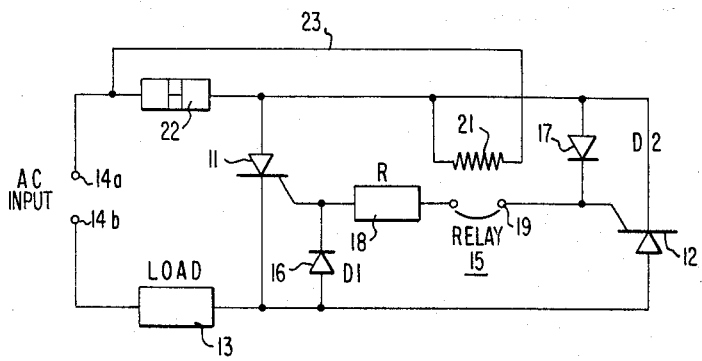
FIG.1
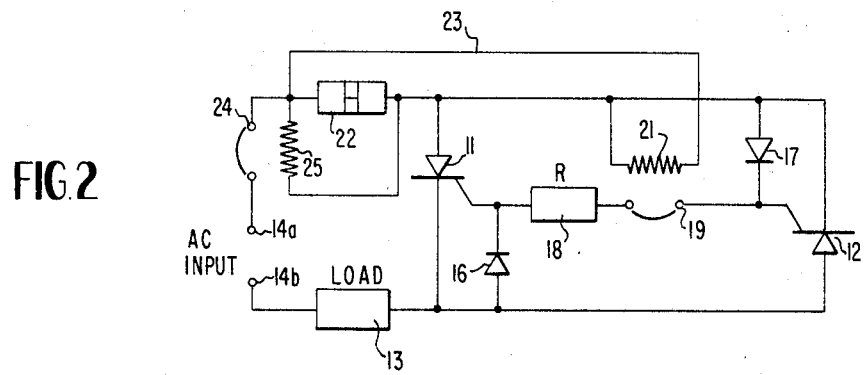
FIG.2
FIG.3
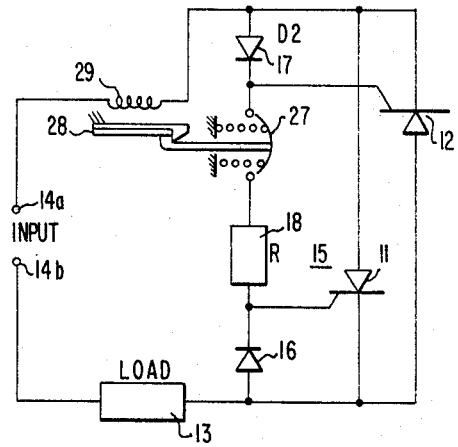
FIG.4
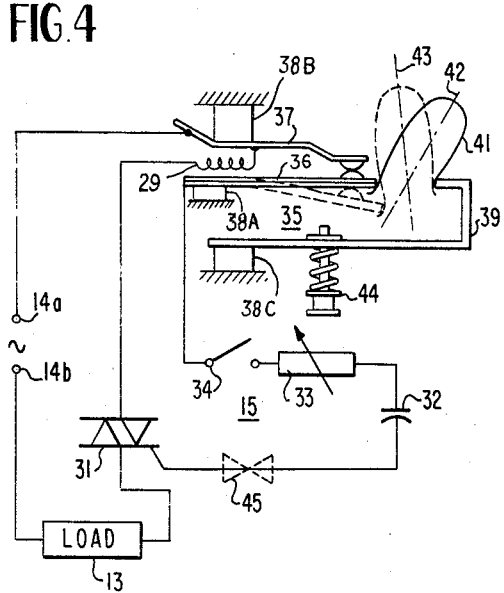
INVENTOR
RALPH L. HURTLE
BY Robert A. Casey
ATTORNEY United States Patent Office 3,501,677
Patented Mar. 17, 1970

3,501,677
CURRENT LIMITING STATIC ALTERNATING CURRENT CIRCUIT BREAKER
Ralph L. Hurtle, West Hartford, Conn., assignor to General Electric Company, a corporation of New York
Filed July 20, 1967, Ser. No. 654,905
Int. Cl. H02h 7/20, 5/04
U.S. Cl. 317—33                     2 Claims

ABSTRACT OF THE DISCLOSURE

An arcless circuit breaker for alternating current, including a pair of parallel oppositely-directed controlled rectifiers with gate bias circuits for turning one rectifier on in each half-cycle of alternating current voltage; a pair of contacts in the gate circuits are operated in response to predetermined current conditions to open the gate circuits and thereby interrupt the current; the means for operating the contacts in one form includes a "change of state" current limiter acting to force current through a contact-operating solenoid.

BACKGROUND OF THE INVENTION

Field of the invention

This invention relates to a new and improved current-limiting static alternating-current circuit breaker. More particularly, the invention relates to a static AC circuit breaker employing solid-state semiconductor switching elements for interrupting power flow upon the occurrence of an overcurrent condition and not requiring any mechanically separable switch contacts in the load current flow.

Description of the prior art

Recent advances in the solid-state semiconductor technology have made available to industry high-power-rated semiconductor devices suitable for switching on and off large blocks of current at relatively high voltages. These devices, typified by the silicon controlled rectifier and the triac, have made practical the development of useful, relatively low-cost, static AC circuit breakers that do not require mechanically separable switch contacts in the power current flow. As a consequence the need for arc chutes, blow out magnetic coils, etc., is obviated, thereby greatly simplifying and reducing the cost of alternating current circuit breakers for a given power rating. Such static circuit breakers are disclosed, for example, in Patent 3,098,949, Goldberg July 23, 1963; 3,042,838 Bedford et al., July 23, 1962; and 3,158,786 Hurtle, Nov. 24, 1964, all assigned to the same assignee as the present invention.

While the static circuit breakers of the prior art, as exemplified by the above listed patents, afford substantial advantages, their cost is relatively high and their circuitry relatively complicated, largely because of the necessity for use of a standby "commutating capacitor" and associated circuitry required for discharging this capacitor at the proper time and for assuring that it is properly charged before the circuit is closed, etc.

OBJECTS OF THE INVENTION

It is therefore a primary object of the present invention to provide a new and improved current-limiting, static, AC circuit breaker employing solid-state semiconductor switching elements for interrupting power flow through the breaker upon the occurrence of an overcurrent which does not require use of a commutating capacitor.

Another object of the invention is the provision of a static, AC circuit breaker of the type described which does not require use of a commutating capacitor and which also provides a current limiting action to limit current flow through the device prior to final interruption of the current.

A still further object of the invention is the provision of an AC circuit breaker of the improved type described which operates to intermittently interrupt and reclose the circuit under certain current conditions and to permanently interrupt the circuit under other current conditions.

SUMMARY OF THE INVENTION

In accordance with the invention in one form, a current-limiting, static, alternating-current circuit breaker is provided comprising a pair of gate-controlled semiconductor devices connected oppositely-directed parallel relation in series with a load and a source of alternating current supply potential.

In another form of the invention, a single bilateral semiconductor triode such as a triac is used instead of two devices. Turn-on circuit means are operatively coupled to the control gates of the semiconductor devices for turning the devices on. In addition, a line-current sensing arrangement is provided for controlling the turn-on circuit means and for deactivating the turn-on circuit means upon the line current exceeding a predetermined safe value. In one form, line-current sensing arrangement includes a current limiter of the vaporizable conductor type for quickly limiting the value of the current to some safe level prior to permanent interruption of the current. The current sensing arrangement may further include a relay having its activating winding connected across the current limiter and having its mechanically separable contacts connected in the low signal level turn-on circuit for permanently deactivating the turn on signal to the load-current carrying semiconductor bidirectional conducting device. The turn-on circuit may also include phase-control firing components for controlling the point in the phase of the supply alternating current where the load-current-carrying semiconductor bidirectional conducting device is turned on and rendered conductive, to thereby proportionally control the value of the excitation current supplied to the load.

BRIEF DESCRIPTION OF THE DRAWINGS

FIGURE 1 is a schematic circuit diagram of a new and improved current-limiting, static, alternating current circuit breaker employing solid state semiconductor switching elements of the silicon controlled rectifier type and a current limiter of a vaporizable conductor type for instantaneously limiting the value of the load current to some predetermined safe value and thereafter causing permanent interruption of the current;

FIGURE 2 is a schematic circuit diagram of a modified form of the AC static circuit breaker shown in FIGURE 1;

FIGURE 3 is a schematic circuit diagram of an AC static circuit breaker employing a heater-actuated bimetal switch and reversely connected silicon controlled rectifiers; and FIGURE 4 is a schematic circuit diagram of an AC circuit breaker employing a bilateral semiconductor triode known as a triac and a bimetal switch having an over-center spring for accomplishing either cycling on and off or permanent turn-off of the triac depending upon whether the overcurrent is a light or heavy overcurrent.

DESCRIPTION OF THE PREFERRED EMBODIMENTS

FIGURE 1 is a schematic circuit diagram of one form of a new and improved current-limiting, static, alternating-current circuit breaker construction in accordance with the invention. The AC static circuit breaker shown in FIGURE 1 includes gate-controlled semiconductor bi-directional conducting means comprised by a pair of back-to-back, reverse-polarity, parallel-connected silicon controlled rectifiers 11 and 12. The best known form of a silicon controlled rectifier is a four layer p-n-p-n semiconductor switch having three accessible layers called the anode, cathode and gate, and whose bistable action depends upon regenerative internal feedback. The silicon controlled rectifier is now a well-known device and is described fully in the "Silicon Controlled Rectifier Manual," third edition, published by the Semiconductor Products Department of the General Electric Company located in Syracuse, N.Y. The reverse-polarity, parallel-connected silicon controlled rectifier (hereinafter referred to as SCR's) are connected in series circuit relationship with a load 13 and a source of alternating current supply potential through the terminals 14a and 14b. For the purpose of the present disclosure, the terminals 14a and 14b may be considered to comprise the source of alternating current supply potential.

Turn-on circuit means shown generally at 15 are provided for supplying turn-on control signals to the control gate of the SCR's 11 and 12. The turn-on circuit means is comprised by a first blocking diode 16 that is connected between one terminal of load 13 and the control gate of SCR 12 through a suitable limiting impedance 18 and normally closed contacts 19 of a solenoid-actuated relay whose control winding is shown at 21. A second blocking diode 17 similarly is connected between what is in effect the supply terminal 14a during normal operating conditions and the control gate of the SCR 11 through the limiting impedance 18 and normally closed contacts 19. The polarities of the two blocking diodes 16 and 17 are arranged such that turn-on signal normally will be applied to the control gate of the SCR 12 when the supply terminal 14b is positive with respect to the supply terminal 14a, and turn-on signals will be supplied to the control gate of the SCR 11 when the reverse condition prevails.

The solenoid-actuated relay 19 and 21 comprises a part of a line-current sensing means which is operatively coupled to and controls the turn-on circuit means 15 for deactivating the turn-on circuit means upon the line-current exceeding a predetermined safe value. The line-current sensing means is further comprised by a current limiter device 22 of the vaporizable conductor type. The current limiter device is connected in series circuit relationship with the load 13, the alternating current supply 14a, 14b and the reverse-polarity, parallel-connected SCR's 11 and 12. A suitable current limiter device for use as the element 22 is disclosed in U.S. Patent No. 3,117,203—R. L. Hurtle, inventor, issued Jan. 7, 1964, entitled, "Circuit Protective Devices and Circuits." For a more complete description of the current limiter device reference is made to this patent. However, to facilitate an understanding of the present invention, the following brief description of the current limiter 22 is provided.

The current limiter 22 is a fast operating current-limiting protective device for power circuits which maintains electrical continuity through the device both during and after its current limiting action. The device is generally comprised by a body of strong and inelastic nonporous insulating material having one or more capillary passages formed therein and filled with a vaporizable conductive metal so as to form a conducting pathway through the device. Opposite ends of the conductive vaporizable material filled pathways are in contact with terminal members insulated from one another and extending to the outside of the enclosure. The design is such that the conductive material in the capillary pathways is capable of carrying a predetermined normal amount of current without substantial losses or change in its electrical properties. However, when the device is subjected to excessive currents of sufficient magnitude to vaporize all or part of the conductive material within the capillaries, an extremely high-pressure, high-resistance, steady-state arc is established in the capillary pathway, which limits and reduces the current flow therethrough rapidly in a matter of milliseconds and results in producing an extremely high voltage across the limiter. The high voltage developed across the current limiter device 22 is sensed by the activating winding 21 of the solenoid actuated relay 19, 21 which is connected across the current limiter 22 by means of the conductor 23. Thus, it will be appreciated that the current limiter device 22 comprises a means for rapidly limiting the value of the load current to some safe level, and at the same time enables the relay winding 21 to sense the overcurrent condition.

During normal operation of the circuit shown in FIGURE 1, the current limiter device 22 exhibits a very small impedance to current flow therethrough as do the SCR's 11 and 12 when they are in their forward conducting condition. In their nonconducting current-blocking condition the SCR's 11 and 12 present substantially infinite impedance to current flow, and therefore block the load current. During intervals when the supply terminal 14a is positive with respect to the supply terminal 14b, the SCR 11 is enabled since its anode is in effect connected to the supply terminal 14a through the zero impedance current limiter 22. During this same half cycle a turn-on gating potential is supplied to the control gate of SCR 11 through the diode 17 since the voltage across this diode is in the forward direction, and under normal operating conditions the relay contacts 19 are closed. This turn-on signal is limited by the limiting resistor 18 and applied to the control gate of SCR 11 to cause it to conduct load current through the load 13 in a first direction. During the alternate half-cycle the terminal 14b will be positive with respect to the terminal 14a. Under these conditions, the SCR 11 will block current flow, but the SCR 12 is enabled. A turn-on signal potential is applied to the control gate of the SCR 12 through the forward biased diode 16, current limiting resistor 18 and closed relay contacts 19 to thereby turn on the SCR 12 and cause it to supply load current through load 13 in the reverse direction.

In the event of an overcurrent, the current limiting device 22 will function to rapidly limit the value of the current to some predetermined low value in the above briefly described manner. Concurrently with this rapid current limiting action, the voltage developed across the current limiting device 22 will actuate the winding 21 of the relay so as to open its contacts 19. The SCR's 11 and 12 are self-commutating when used with alternating current, that is to say, they will automatically turn off during the current zero occurring after each half cycle of the supply alternating current. Accordingly, at the end of the half cycle during which the overcurrent occurred, either the SCR 11 or 12, whichever was conducting, will reassume its current blocking condition. In the ensuing half cycle, because the relay contacts 19 are opened, the alternate SCR 11 or 12 will not be rendered conductive and the circuit assumes a permanent off condition.

FIGURE 2 of the drawings illustrates a modified form of the circuit shown in FIGURE 1 wherein a conventional solenoid actuated contactor switch comprised by a set of physically separable, mechanically movable contacts 24 and a solenoid winding 25, is included in the circuit for providing visibly open contacts in the supply line upon the occurrence of an overcurrent. For this purpose, the physically separable, mechanically movable contacts 24 are connected in the series circuit comprised by the source of alternating current 14a, 14b, the load 13, the reverse polarity, parallel connected SCR's 11 and 12 and the current limiter device 22. The actuating winding 25 of the contactor switch is connected across the current limiter 22 in parallel with the actuating winding 21 and will sense the voltage gradient development across the current limiter device 22 upon the occurrence of an overcurrent. As a consequence, the contacts 24 will open and will provide a visible indication to an operator of the circuit that the circuit breaker has been actuated.

FIGURE 3 of the drawings illustrates an embodiment of the invention wherein a different form of the line-current sensing means is provided. In the AC static circuit breaker shown in FIGURE 3, the line-current sensing means is comprised by a heater actuated bimetal switch 27, 28 and 29. The heater actuated bimital switch includes a set of mechanically movable, physically separable contacts 27 which are connected in the turn-on circuit means in series with the limiting resistor 18 between the cathodes of the two blocking diodes 16 and 17 and control gates of SCR's 11 and 12. The control gates of the SCR's 11 and 12 are connected to the cathodes of the two blocking diodes 16 and 17, respectively, in the same manner as shown in FIGURES 1 and 2. The mechanically movable, physically separable contacts 27 are actuated by a bimetal moving member 28 that is physically disposed in heat conducting relationship with a heating element 29 comprising a part of the overall bimetal switch. The heating element 29 is connected in the series circuit comprised by the alternating current supply terminals 14a, 14b, load 13 and the reverse polarity, parallel connected SCR's 11 and 12.

The circuit shown in FIGURE 3 functions as follows: During normal operation of the circuit, the switch contacts 27 are closed so that turn-on signals are applied to alternate ones of the SCR's 11 and 12 in the manner described above with relation to FIGURE 1. During normal operating periods, the current flow through the heating element 29 by design is not sufficient to heat the bimetal actuating element 28 enough to open the switch contacts 27. However, upon the occurrence of an overcurrent, the heat produced by the heating element 29 causes the bimetal actuating element 28 to open the switch contacts 27 thereby deactivating the turn-on circuit means 15, and preventing the further provision of turn on signals to the control gate of the SCR's 11 and 12.

FIGURE 4 of the drawings illustrates a different embodiment of the invention wherein the gate-controlled semiconductor bidirectional conducting means includes a single bilateral semiconductor triode 31 known as a triac. The bilateral triode switch is described more fully in the textbook entitled, "Semiconductor Controlled Rectifiers," by F. E. Gentry, F. W. Gutzwiller, Nick Holonyak, Jr., and E. E. Von Zastrow, published by Prentice Hall, Inc., of Engelwood Cliffs, N.J., Library of Congress catalogue card number 64-21172. The bilateral semiconductor triode (triac) is manufactured and sold commercially by the General Electric Company, Syracuse, N.Y. The triac can be triggered into conduction in either direction by the application of suitable enabling potentials across its load terminals and of a low voltage, low current pulse between the gate terminal and the adjacent load current terminal. Since the triac 31 will conduct on both alternations of the AC supply current, it constitutes a single device that can be substituted for two reverse-polarity parallel-connected SCR's. The triac 31 is connected in series circuit relationship with the load 13 across the alternating current supply terminals 14a, 14b.

The turn-on circuit means 15 for turning on the triac 31 includes a phase-controlled firing means including a capacitor 32, a variable resistor 33, a manually operable on-off switch 34, and an overcenter spring controlled bimetal switch 35. All of elements 32 through 35 are connected in series circuit relationship between the control electrode of triac 31 and one of its load terminals and serves to provide turn-on control signals to the control gate of the triac 31 during each half cycle of the alternating current supply potential applied to terminals 14a and 14b.

The overcurrent spring actuated bimetal switch 35 has a bimetal switching arm 36 that forms the movable contact of the switch, and is normally closed on a fixed contact arm 37. A heater coil 29 is connected in series with the load 13 and is positioned adjacent the bimetal arm 36. The contact arms 36 and 37 are supported on a mounting member 38A and 38B, respectively. A supporting arm 39 supported on a mounting member 38C supports one end of an overcenter spring 41 extending between the arm 39 and the end of bimetal arm 36. The arrangement is such that when the overcenter spring 41 is in the position shown in solid lines having its axis centered along the dash-dot line 42, the contacts of the switching arms 36 and 37 are maintained in closed position. However, if due to an overcurrent flowing in the bimetallic arm 36, the overcenter spring 41 is shifted to the position shown in dotted lines wherein its axis is centered along the dash-dot line 43, the contact arms 36 will be thrown open and permanently maintained that way by the overcenter spring 41. When thus permanently opened, it is necessary to reset the bimetal switch arrangement manually, such as by pulling outwardly on the button 44. An overcenter spring bimetal switch of the type described is manufactured and sold by the H. A. Wilson Company of Union, N.J.

The AC static circuit breaker of FIGURE 4 operates in the following manner: Under normal operating conditions, the circuit may be placed in operation by closing the manually operated on-off switch 34 and, if necessary, actuating the button 44 so as to cause the overcenter spring 41 to assume its solid line position centered along the axis 42. With the bimetallic switch 35 in this position, excitation current is supplied through the closed contact arms 36 and 37 and through the phase-shift networks comprised by variable resistor 33 and capacitor 32 to the control electrode of the triac 31. The variable resistor 33 and capacitor 32 form a phase-shift network which by proper adjustment of the variable resistor 33 can control the point in the phase of the supply alternating current potential at which a gating-on signal will be supplied to the control electrode of the triac 31. If desired an avalanche diode shown in dotted lines at 45 may be included in the circuit to sharpen the turn-on gating pulses applied to the control electrode of triac 31 during each alternate half cycle. With this arrangement, during half cycles when the supply terminal 14a is positive with respect to the supply terminal 14b, load current will be supplied through triac 31 and load 13 in a first direction. During the alternate half cycle for which the terminal 14b is positive with respect to the terminal 14a, the triac 31 will be gated on to supply load current flow in the reverse direction. This can be accomplished with the circuit of FIGURE 4 due to the fact that a triac 31 may be gated on in either direction by the application of a turn-on signal to its control electrode of either positive or negative polarity. Similarly, the avalanche diode 45 (if used) is bidirectional conducting in its characteristics so that during the first-mentioned half cycle, positive gating-on pulses are supplied to the control electrode of triac 31, and during the alternate half cycle, negative turn-on pulses are applied thereto. By appropriate adjustment of the resistor 33 the alternating current supplied to load 13 may be proportionally controlled so long as the current does not exceed some predetermined safe value.

In the event of a light overcurrent condition occurring in the circuit shown in FIGURE 4, the light overcurrent causes heating of the bimetallic switch arm 36 by the heater 39. This heating of the switch arm 36 causes it to deflect sufficiently to open the contact arms 36 and 37, and thereby interrupt the application of turn-on signal pulses to the control electrode of the triac 31. As a consequence the triac 31 will not be turned on for a number of half cycles sufficient to allow the bimetallic switch arm 36 to cool. Upon cooling the bimetallic switch arm 36 again closes on the contact arm 37 to reinitiate operation of the circuit. If the light overload condition continues to exist, the circuit will cycle on and off in this manner thereby indicating to an operator of the circuit that a light overcurrent condition exists. If desired, a suitable warning light, not shown, may be utilized which, by its flashing, will call attention to the overloaded condition of the circuit so that it may be remedied prior to complete interruption.

Should a large or heavy overcurrent be drawn by the circuits of FIGURE 4, the large overcurrent heats the bimetallic switch arm 36 so much that it deflects so far that it causes the overcenter spring 41 to be shifted from its right hand position to its left-hand position centered along the dot-dash line 43. With the overcenter spring in its left-hand position the switch contact arms 36 and 37 will be maintained permanently opened, thereby interrupting current flow through the load 13.

From the foregoing description it can be appreciated that the present invention provides new and improved, current-limiting, static, AC circuit breakers employing solid-state semiconductor switching elements for interrupting power flow through the breaker upon the occurence of an overcurrent condition, and not requiring any mechanically separable switch contacts in the load current flow. The design is such that the circuit is simple and inexpensive as well as reliable in operation. If desired the new and improved static AC circuit breaker can be designed to provide current limit of current flow through the device prior to permanent interruption of the current flow. Further, if desired, the static circuit breaker may be designed to provide proportional control of current flow through the load under normal operating conditions as well as to provide circuit interruption when necessary.

Having described several embodiments of a new and improved current limiting static alternating current circuit breaker constructed in accordance with the invention, it is believed obvious that other modifications and variations of the invention are possible in the light of the above teachings. It is therefore to be understood that changes may be made in the particular embodiments of the invention described which are within the full intended scope of the invention.

What I claim as new and desire to secure by Letters Patent of the United States is:

1. A current-limiting static alternating current circuit breaker comprising in combination:
   (a) gate-controlled semiconductor bidirectional conducting means having terminals for electrical connection in series circuit relationship with a load and a source of alternating current power;
   (b) turn-on circuit means operatively connected to the control gate of said gate-controlled semiconductor bidirectional conducting means so as to turn said conducting means on upon increase of source potential to a predetermined level of either polarity;
   (c) an electrical control element connected electrically in series with said gate-controlled semiconductor bidirectional conducting means, said control element comprising means having relatively low electrical resistance when carrying a first predetermined value of electrical current therethrough and changing suddenly to a relatively high electrical resistance upon increase of said current to a second predetermined value above said first predetermined value of current;
   (d) a first relay including a winding connected electrically in parallel with said electrical control element, said first relay including a pair of separable contacts electrically in series with said turn-on circuit means, said first relay opening said contacts and disconnecting said turn-on circuit means upon the passage of predetermined current through said winding;
   (e) a second electric relay including a winding connected electrically in parallel with said control element, said second relay including a pair of contacts connected electrically in series with said electrical control element and said gate-controlled semiconductor bidirectional conducting means;
   (f) said control element when changing from said low resistance condition to said high resistance condition upon the increase of current therethrough from said first level to said second level diverting a portion of the line current through both of said first and second relays to cause opening of said turn-on circuit means by said first relay and disconnection of said load from said power source by said second relay.

2. A current limiting static alternating current circuit breaker as set forth in claim 1 wherein said electrical control element comprises a current limiter of the confined vaporizable conductor type in which a vaporizable conductor vaporizes to render said control element substantially nonconductive and thereafter recondenses to render said control element conductive.

References Cited

UNITED STATES PATENTS

| | | | |
|---|---|---|---|
| 1,859,985 | 5/1932 | Riedel | 337—345 |
| 2,414,531 | 1/1947 | Johns | 337—89 |
| 2,558,219 | 6/1951 | Kohl | 337—343 X |
| 2,607,029 | 8/1952 | Kesselring. | |
| 3,117,203 | 1/1964 | Hurtle | 337—121 X |
| 3,132,287 | 5/1964 | Yarbrough | 323—24 X |
| 3,158,786 | 11/1964 | Hurtle | 317—33 |
| 3,307,042 | 2/1967 | Fogleman | 323—24 X |
| 3,392,284 | 7/1968 | Cain. | |

OTHER REFERENCES

G.E. Application Note I, "AC Static Switch," December 1958, p. 40.

G.E. Application Note II, "AC Static Switch," May 1964, p. 3.

LEE T. HIX, Primary Examiner

W. H. BEHA, JR., Assistant Examiner

U.S. Cl. X.R.

317—40